(12) United States Patent
Hoffman

(10) Patent No.: US 7,311,955 B1
(45) Date of Patent: *Dec. 25, 2007

(54) LAMINATED PACKAGE AND METHOD OF PRODUCING THE SAME

(75) Inventor: Roger P. Hoffman, Green Bay, WI (US)

(73) Assignee: The Hoffman Group, Green Bay, WI (US)

( * ) Notice: Subject to any disclaimer, the term of this patent is extended or adjusted under 35 U.S.C. 154(b) by 368 days.

This patent is subject to a terminal disclaimer.

(21) Appl. No.: 09/632,140

(22) Filed: Aug. 3, 2000

Related U.S. Application Data

(60) Continuation of application No. 09/205,506, filed on Dec. 3, 1998, now Pat. No. 6,099,674, which is a division of application No. 08/579,219, filed on Dec. 28, 1995, now Pat. No. 5,882,746.

(51) Int. Cl.
*B32B 1/02* (2006.01)
(52) U.S. Cl. .................. 428/35.7; 428/34.1; 428/34.2; 428/34.3; 428/35.9; 428/195; 229/5.81; 229/939; 220/62.2; 220/62.22
(58) Field of Classification Search .............. 428/34.2, 428/34.3, 195, 34.1; 229/5.81, 939, 62.2, 229/62.22
See application file for complete search history.

(56) References Cited

U.S. PATENT DOCUMENTS

| | | | | |
|---|---|---|---|---|
| 4,128,169 A | * | 12/1978 | Arneson | 206/141 |
| 5,002,186 A | * | 3/1991 | Cooper | 206/433 |
| 5,116,649 A | * | 5/1992 | Massouda | 428/34.2 |
| 5,882,746 A | * | 3/1999 | Hoffman | 428/342 |

* cited by examiner

*Primary Examiner*—Marc A. Patterson
(74) *Attorney, Agent, or Firm*—Philip M. Weiss; Weiss & Weiss

(57) ABSTRACT

A laminated paperboard package is produced by initially printing graphics by high speed printing on a sheet of clay-coated publication paper. The printed paper is then continuously applied to a surface of cellulosic substrate and bonded to the substrate, preferably through use of starch as an adhesive, to provide a laminated product. The laminated product is then die cut to the desired shape, folded and glued into the configuration of a box or container. A layer of water absorbent, cellulosic fiber material can be bonded to the inner surface of the substrate to prevent moisture from the contained product from seeping outwardly through the substrate to the printed paper.

4 Claims, No Drawings

LAMINATED PACKAGE AND METHOD OF PRODUCING THE SAME

RELATED APPLICATIONS

The present application is a continuation of Ser. No. 09/205,506, now U.S. Pat. No. 6,099,674, granted Aug. 8, 2000; which is a divisional application Ser. No. 08/579,219, now U.S. Pat. No. 5,882,746, granted Mar. 16, 1999.

BACKGROUND OF THE INVENTION

In recent years with the advent of mega-retailers and mass merchandizing, packaging has rapidly evolved. Today, more than ever, packaging is an extension of the marketing effort and product differentiation is often more important than the product itself. Thus product differentiation through enhanced printed graphics on the packaging is critical.

In the paper industry, the term "paperboard" is generally considered to include container board, such as corrugated boxes and linerboard, as well as boxboard, which includes beverage carriers, cereal boxes, milk cartons, small folded boxes, and the like. It has been recognized that sharp, precise graphics cannot be obtained when printing directly on paperboard products, due to the fact that the paperboard printing surface is relatively rough or uneven, as compared with clay coated paper. Further, paperboard normally has a grey or brown color, and printing directly on the darker color of the paperboard will tend to distract from the resolution of the graphs. To meet the demand for improved graphics, there have been attempts to use white packaging substrates produced from bleached pulp. While the white substrates provide enhanced printing surfaces, as compared with the normal brown and grey paperboard, the white paperboard is considerably more costly to produce and lacks the strength of an unbleached pulp substrate. Further, paperboard is relatively thick as compared to publication paper and cannot be printed through use of the modern high speed printing processes that are used for paper printing.

Beverage carrier, which is a type of paperboard, is designed to contain beverage cans in six-packs, twelve-packs, cases, or the like. As the beverage cans have considerable weight, it is important that the beverage carrier have high tear strength. The typical beverage carrier is a two-ply product, generally consisting of a base ply of virgin Kraft formed from long soft wood fibers, which provide the increased tear strength, and an outer or top ply, generally formed of shorter fiber hardwood. The top ply typically receives a clay coating and graphics are then printed on the clay coated top ply. The printed sheet is then die-cut into sections and each section is folded and glued into the shape of a box or container to subsequently receive the beverage cans.

Due to the relatively rough surface of the coated paperboard, as compared to clay coated paper, the printed graphics do not have the fine or sharp resolution compared to graphics printed on paper. Further, it is difficult to produce the clay coated paperboard. Because of the dark color of the substrate, the clay coating must be thick enough to mask the color, but if the clay coating is too thick, it may crack and adversely effect the printed graphics.

A further problem in the production of beverage carrier is that the printing cannot be done on high speed web offset presses as with paper, so that less sophisticated, lower speed printing equipment must be employed.

Thus, there has been a distinct need for paperboard packaging having enhanced graphics.

SUMMARY OF THE INVENTION

The invention is directed to a laminated paperboard package having enhanced graphics and to a method of producing the same. In accordance with the invention, a sheet of clay-coated or super calendered publication paper is printed with graphics, preferably by a high speed web offset printer. The printed sheet is then wound in coil form and stored for subsequent application to a cellulosic substrate. When producing beverage carrier, the cellulosic substrate preferably consists of one or more plies of unbleached virgin Kraft pulp, while when producing a product such as cereal box, the cellulosic substrate can be formed of one or more plies of recycled fibers.

At the box manufacturing site, the coiled printed paper is unwound and continuously applied to a surface of the moving cellulosic substrate and bonded to the substrate by an adhesive, which preferably takes the form of hydrolyzed starch, to thereby provide a laminated product.

The printed publication paper is relatively thin, having a thickness generally in the range of 0.00075 inch to 0.00200 inch, and as the thin layer of starch adhesive is relatively translucent, the dark colored cellulosic substrate may show through the printed paper, thus detracting from the appearance of the graphics. To prevent "show-through", finely divided particles of a generally inert white pigment, such as calcium carbonate or titanium dioxide can be incorporated in the starch adhesive, or alternately, a second clay coat can be applied to the undersurface of the paper prior to bonding the paper to the substrate.

After application of the printed paper to the cellulosic substrate, the laminated product is then die cut into a plurality of sections or segments of desired shape and each section is then folded and glued to form the configuration of a box. The boxes, in flat folded shape, are shipped to the manufacturer of the product, the boxes are then opened, the product inserted and the end flaps are then glued or secured to provide the final packaged product for distribution.

In certain instances when dealing with beverage carrier, the beverage cans may be introduced into the laminated box in a refrigerated state. Subsequently moisture may condense on the refrigerated cans, which can cause warping or disfiguration of the laminated box. To overcome this problem, a layer of water absorbent, cellulosic material, such as Kraft paper, corrugated medium, or newsprint can be applied to the inner surface of the cellulosic substrate prior to cutting and folding of the laminated sheet. The water absorbent cellulosic layer is applied to the inner surface of the substrate through use of a water resistant adhesive. The water absorbent layer will absorb any moisture which may condense on the cans contained within the package to prevent warping of the laminated package.

The invention provides enhanced graphics for paperboard packaging by use of high speed printing on publication paper, which is then bonded to the cellulosic substrate through an adhesive which preferably takes the form of hydrolyzed starch.

DESCRIPTION OF THE PREFERRED EMBODIMENT

The invention is directed in general to a laminated printed package consisting of a cellulosic substrate having a sheet of publication paper printed with graphics applied to the outer surface of the substrate through use of an adhesive, which preferably takes the form of starch.

The paper sheet to be used in the invention, is preferably clay coated publication paper which has a thickness generally in the range of 0.00075 inch to 0.00200 inch. More particularly, the paper can consist of clay coated ground wood paper produced by mechanical pulping operations. In addition, clay coated free sheet paper produced by chemical pulping operations, or super-calendared paper, or clay-coated newsprint can be utilized.

The paper in coiled form is unwound and printed by conventional techniques, preferably by high speed, offset printing, operating at a speed generally in the range of 1500 to 3200 ft. per minute. Alternately, high speed rotogravure printing can be utilized to print the graphics on the clay-coated or smooth surface of the paper. After printing, the paper is rewound into coiled form and stored for subsequent application to a cellulosic substrate at the location of the box manufacturer.

The cellulosic substrate can be produced by conventional procedures and can consist of unbleached virgin Kraft pulp, recycled pulp produced from old corrugated containers, newsprint, white office waste, and the like, or mixtures or virgin pulp and recycled pulp. The substrate is produced in one or more plies and generally has a basis weight of 40 lbs. to 90 lbs. per 1,000 sq. ft., and a thickness of 0.012 to 0.025 inches. When producing beverage carrier, where high tear strength is required in the laminated product, long fiber, virgin soft wood pulp is preferred as the base layer of the substrate, and an outer or top ply of finer fiber hardwood pulp can be applied to the base ply. When producing a laminated product that is designed to contain products of lesser weight, such as cereal boxes, milk cartons, or the like, the substrate can be formed of one or more plies of recycled pulp, produced from old corrugated cartons, newsprint, office waste, and the like.

The cellulosic substrate, when producing a high strength product such as beverage carrier, can be produced by a typical Kraft process, in which wood chips are cooked at a temperature of approximately 340° F. with the addition of sodium hydroxide and sodium hydrosulfide (conventional Kraft white liquor) for a period of about 20 to 60 minutes to dissolve the lignin and hemi-cellulose. After cooking, the pulp is washed which acts to remove up to 98% of the treating chemicals. The pulp is then diluted with water to a solids content of about 4% and treated with sulfuric acid and alum to obtain the desired pH. The pulp stock is then delivered to the headbox of the forming section of the papermaking machine, and the pulp slurry is fed from the headbox onto the forming fabric to provide a pulp mat.

Water is removed from the pulp mat by both gravity and mechanical induced vacuum, and the partially dewatered pulp then passes through the press section and drying section of the papermaking machine, in a conventional manner, to produce the dry cellulosic substrate.

If the substrate consists of multiple plies, the pulp for each additional ply is fed from a second headbox located downstream of the first headbox onto the base ply to provide the composite structure in a conventional manner.

When producing paperboard packaging, such as cereal box, the cellulosic substrate will generally consist of multiple plies of recycled fibers. The pulping of the recycled fibers is carried out in a Iconventional manner, in which the recycled cellulosic waste is mixed with water and chemical dispersants, such as sodium hydroxide. The mixture is then subjected to a shear type of pulping agitation to break down the cellulosic waste into individual fibers and toiliberate inks and toners. During pulping the dispersant chemicals act to dissociate the ink from the fibers, and disperse the ink particles in the aqueous pulp slurry. Following the dispersion, the pulp can then be subjected to conventional ink removal operations, which can be accomplished either by froth floatation or dilution washing.

When utilizing virgin unbleached Kraft pulp, the cellulosic substrate will be brown in color, while the substrate formed from recycled materials will generally be a grey color.

At the site of the box manufacturer, the printed paper is uncoiled, and continuously bonded to the moving sheet of the cellulosic substrate through use of an adhesive which preferably takes the form of hydrolyzed starch. The starch to be used is preferably an amphoteric waxy maze-type, such as sold under the designation CAT0225 by National Starch Company. The starch is hydrolyzed or cooked, preferably by a conventional steam injector which heat and hydrolyses the starch.

In practice, the substrate is generally heated to a temperature in the range of 150° F. to 200° F. and the adhesive is preferably applied to the undersurface of the paper by a gate roll size press, or a metering blade. The paper with the adhesive on its undersurface is then applied to the upper surface of the cellulosic substrate to provide a laminated product which is passed through compression rolls to firmly bond the printed paper to the substrate.

The use of starch as the adhesive has distinct advantages. Initially, the starch has advantages from an ecological standpoint in that there are no hazardous emissions, as can occur when using a solvent-base adhesive. Further, it is believed that the starch, being impregnated into the outer face of the cellulose substrate, will increase the dry strength of the substrate.

In the laminated product, the printed paper extends over the entire surface area of the substrate. The laminated product is then die cut into a plurality of sections or segments of the desired shape or configuration. Each section is then folded and glued to form an open-ended box-like structure, and the flat boxes are then shipped to the manufacturer of the product to be contained. At the site of the product manufacturer, the flat boxes are opened, the product inserted, and the end flaps are then glued to provide the final packaged product that can be sent for distribution.

In certain instances, the items, such as beverage cans, inserted into the laminated package may be cold or refrigerated, and in this case, moisture may condense on the cans. It has been found that the condensed moisture may tend to warp or disfigure the laminated package. To overcome this problem, a layer of water absorbent Kraft paper, corrugated medium or newsprint, can be applied to the inner surface of the cellulose substrate or base layer, through use of a water resistant adhesive which can take the form of an epoxy resin, urea formaldehyde resin, or the like. Any moisture condensing on the refrigerated cans will be absorbed in the inner layer of cellulosic material and will not migrate through the laminated package due to the barrier created by the water resistant adhesive, thus eliminating warping or other disfigurement of the package.

It is also contemplated that in certain instances, a layer or film of water resistant material, such as polyethylene film, can be applied to the inner face of the cellulosic substrate prior to cutting and folding of the laminated material. The water resistant film will prevent migration of water or moisture through the laminated package to aid in minimizing any warpage or disfigurement of the package.

The publication paper is very thin and tends to be translucent. Similarly, the layer of starch adhesive is translucent, with the result that there may be "show-through" of the dark colored cellulosic substrate which could detract from the appearance of the printed graphics. To prevent "show-through", finely divided particles of a generally inert pigment, such as calcium carbonate, titanium dioxide, or the like, can be incorporated with the starch. Alternately, "show-through" can be prevented by applying a second coating of clay to the undersurface of the paper, the undersurface being the surface of the paper adjacent the cellulosic substrate. These constructions will prevent "show-through" of dark colored substrate and maintain the fine resolution of the graphics.

The invention combines the strength of the publishing business with the need for enhanced graphics in packaging, by laminating printed rolls of paper to a heavier weight cellulosic substrate, immediately preceding the die cutting, folding and gluing process.

What is claimed is:

1. A laminated beverage carrier for beverage containers comprising a laminated composite sheet folded and secured in the configuration of a box, said sheet comprising a non-corrugated base layer of unbleached cellulosic fibers and having an inner surface and an outer surface, an outer layer of separately formed non-corrugated paper having an inner surface and an outer surface, printed graphics disposed on the outer surface of the outer layer, and adhesive disposed between the inner surface of the outer layer and the outer surface of the base layer and serving to bond the outer layer to said base layer, the inner surface of said outer layer being bonded continuously to the outer surface of said base layer.

2. The laminated beverage carrier for beverage containers of claim 1 wherein said cellulosic fibers are selected from the group consisting of unbleached virgin kraft pulp and recycled pulp.

3. The laminated beverage carrier for beverage containers of claim 1 further comprising a layer of water absorbent material disposed on the inner surface of said base layer.

4. The laminated beverage carrier for beverage containers of claim 3 further comprising a film of water resistant adhesive bonding said absorbent material to said base layer.

* * * * *